Aug. 6, 1935.  W. H. BASELT  2,010,531
BRAKE HEAD
Filed Sept. 18, 1931
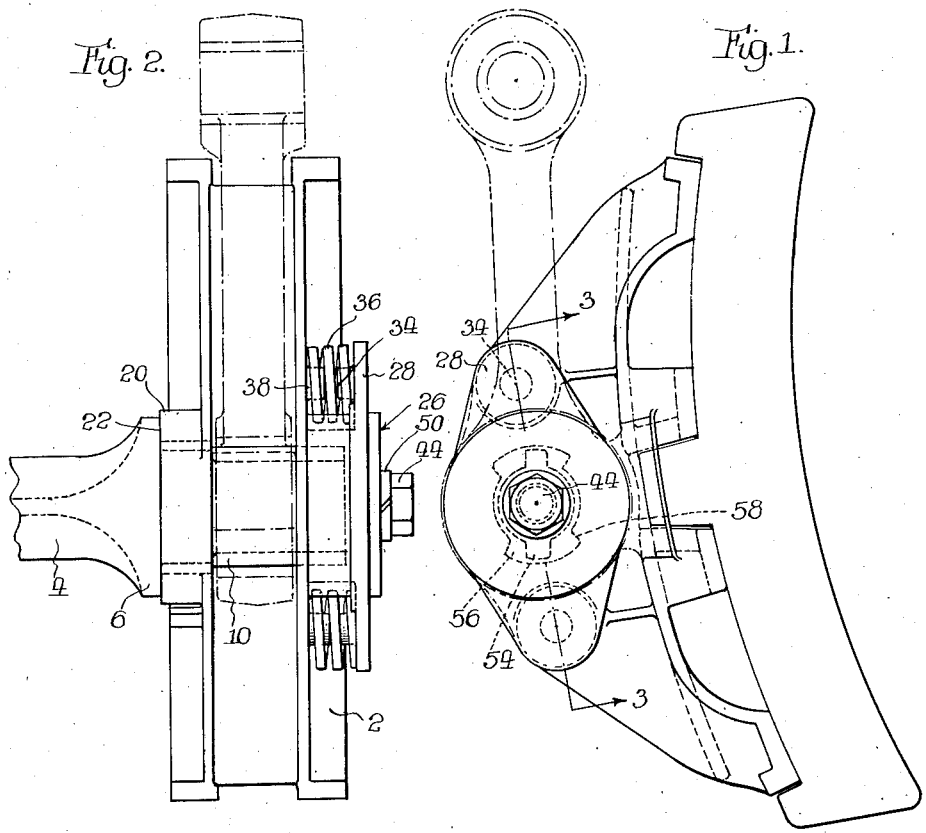
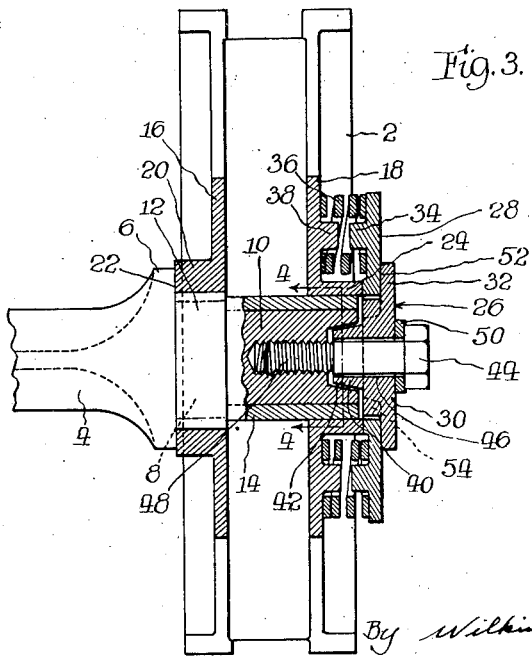
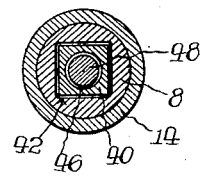
Inventor:
Walter H. Baselt,
By Wilkinson, Huxley, Byron & Knight
Attys.

Patented Aug. 6, 1935

2,010,531

UNITED STATES PATENT OFFICE 2,010,531

BRAKE HEAD

Walter H. Baselt, Chicago, Ill., assignor to American Steel Foundries, Chicago, Ill., a corporation of New Jersey Application September 18, 1931, Serial No. 563,488

41 Claims. (Cl. 188—230)

The present invention relates to brake riggings, and more particularly pertains to novel mounting and securing means for a brake head.

Among the objects of the present invention is to provide novel means for mounting a brake head upon a beam of a brake rigging in such a manner as to maintain the brake head in its proper operative relation with a wheel.

The invention comprehends the idea of providing an adjustable means for mounting a brake head upon a beam, simple in arrangement yet of rugged construction to withstand severe vibrations to which the same may be subjected.

The invention includes the idea of providing a novel locking device or means for securing a brake head on a brake beam, this device including means for frictionally resisting movement of the brake head as also means for limiting rotation thereof, whereby the head is adapted to be maintained in its operative position and to have sufficient movement to compensate for the changing diameter of the wheel caused by wear.

Another object within the purview of the present invention is to provide a novel locking means for securing a brake head to a beam and including means adapted to provide the required amount of flexibility, whereby said head may have proper and sufficient movement in its various operative positions, yet effectively securing and retaining the head in cooperative relation with the brake beam and a car wheel associated therewith.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a view in side elevation of a brake head provided with a locking device made in accordance with the present invention;

Figure 2 is a view in end elevation of the brake head locking means shown in Figure 1 of the drawing;

Figure 3 is a view partly in cross section and taken in a plane represented by line 3—3 of Figure 1 of the drawing; and Figure 4 is a view in cross section taken in the plane represented by line 4—4 of Figure 3 of the drawing.

Referring now more in detail to the drawing, a brake head locking device made in accordance with the present invention is disclosed in association with a brake head 2 and for locking or securing the brake head 2 upon the end of a brake beam 4. The end of this brake beam 4 is shown as being formed with a shoulder or collar 6 beyond which is a journal portion in the form of a trunnion comprising an enlarged part 8 and a part 10 having a smaller diameter, these trunnion portions being provided with case hardened bushings 12 and 14, respectively.

The brake head 2 is formed with spaced walls 16 and 18, the wall 16 having a central hub 20 adapted to be mounted upon the bushing 12 and in frictional contact over the surface indicated as 22 with the collar 6 of the brake beam, while the wall 18 is formed with a central hub 24 mounted upon the bushing 14, the wall 18 and hub 24 being associated with a locking or securing device 26 made in accordance with the present invention.

This locking device 26 includes two relatively movable members 28 and 30, the plate 28 being annular and disposed between the end of the hub 24 and the flange 32 of the member 30. This plate 28 is formed as shown in Figure 1 of the drawing and is provided with integral lugs or projecting elements 34 adapted to receive one end of coil springs 36 interposed between the plate 28 and the wall 18 of the brake head. These coil springs 36 have their other end disposed about the lugs or projecting elements 38 made integral with the wall 18 of the brake head and normally positioned in opposite relation to the lugs 34 of the plate 28.

The member 30 of the locking device is formed with a non-circular shank or projecting portion 40 adapted to be received in a non-circular recess 42, the member 30, as likewise the locking device as a whole, being secured to the end of the brake beam 4 by means of a cap screw 44 passing through an elongated bore 46 provided in the member 30 and threadedly engaging the brake beam at 48. The locking device is positively retained in operative position by means of this cap screw 44 and a washer 50 interposed between the head of the cap screw and the securing member 30.

It will be quite apparent that because of the action of the coil springs 36 interposed between the brake head 2 and locking member 28, the movement of rotation of the brake head 2 is frictionally resisted by the engaging surfaces 22 and similar engaging surfaces 52 between the flange 32 and the member 28. The frictional resistance between these indicated surfaces tends to hold the brake head in its normally operative position and provide a flexible arrangement whereby the adjustability is maintained between the brake head and the surface of a car wheel associated therewith.

The present invention further contemplates the idea of limiting movement of rotation of the brake head 2 upon the end of the brake beam 4. This limiting of rotation is effected by the interlocking engagement between the members 28 and 30 of the locking device. The member 30 is formed with oppositely disposed lugs 54 adapted to be received within the openings or cut-out portions 56 of the spring plate member 28, these openings 56 being formed with shoulders, such as at 58, for engagement with the lugs 54 to limit the rotation of the plate or member 28, as likewise the brake head 2 resiliently associated therewith, as by means of the coil spring 36.

It will be seen from the above disclosure, that the present locking device provides suitable means for maintaining a brake head in its various operating positions at all times, as well as limiting its movement of rotation so that the same is never free to become dissociated from its operative position or positions with the car wheel.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging, the combination of a brake beam, a brake head mounted thereon, and locking means for said brake head including means for limiting rotation of said brake head.

2. In a brake rigging, the combination of a brake beam, a brake head mounted thereon, and locking means for said brake head, said means including means for frictionally resisting movement of said head and means for limiting rotation of said head.

3. In a brake rigging, the combination of a brake beam, a brake head mounted thereon, and means for securing said head on said beam, said means including means for limiting rotation of said head relative to said beam.

4. In a brake rigging, the combination of a brake beam, a brake head mounted thereon, means for securing said head on said beam, means for frictionally resisting movement of said head, and means between said securing means and head for limiting rotation of said head on said beam.

5. In a brake rigging, the combination of a brake beam, a brake head mounted thereon, and locking means for securing said head on the end of said beam, said brake head being resiliently associated with said locking means, said locking means having means for limiting rotation of said head.

6. In a brake rigging, the combination of a brake beam, a brake head mounted thereon, securing means for said head, resilient means between said securing means and head, and means associated with said securing means for limiting rotation of said head.

7. In a brake rigging, the combination of a brake beam, a brake head mounted thereon, and locking means associated with said head for securing the same on said beam, said means including interlocking members having limited relative movement for limiting rotation of said head.

8. In a brake rigging, the combination of a brake beam, a brake head mounted thereon, and means for securing said head on said beam, said head having a member associated therewith and interlocking with said securing means for limiting rotation of said head.

9. In a brake rigging, the combination of a brake beam, a brake head mounted thereon, locking means associated with said head for securing the same on said beam, and resilient means associated with said locking means and head, said locking means including interlocking members having limited relative movement for limiting rotation of said head.

10. In a brake rigging, the combination of a brake beam, a brake head mounted thereon, locking means for securing said head on said beam, and resilient means disposed between said locking means and head and engaging therewith, said locking means having a non-circular portion engaging with said beam.

11. In a brake rigging, the combination of a brake beam, a brake head mounted thereon, locking means for securing said head on said beam, said means including interlocking members having limited relative movement for limiting rotation of said head, one of said members having a non-circular part for engagement with said beam, and resilient means between the other of said members and head.

12. In a brake rigging, the combination of a brake beam, a brake head mounted thereon, locking means for securing said head on said beam, resilient means disposed between said locking means and head and engaging therewith, and means for limiting rotation of said head on said beam.

13. In a brake rigging, the combination of a brake beam, a brake head mounted thereon, locking means for securing said head on said beam, and resilient means between said locking means and head, said locking means including means for limiting rotation of said head on said beam.

14. In a brake rigging, the combination of a brake beam provided with a shoulder, a brake head mounted on said beam and cooperating with said shoulder, means for locking said head on said beam, and means between said head and locking means and engaging therewith for urging said head into frictional engagement with said shoulder whereby movement of said head is resisted.

15. In a brake rigging, the combination of a brake beam provided with a shoulder, a brake head mounted on said beam and cooperating with said shoulder, means for locking said head on said beam, said means including a member disposed in opposite relation to said shoulder, a second member associated with said head and adapted to cooperate with said first-named member, and means for urging said head into frictional engagement with said shoulder and said second member into frictional engagement with said first-named member whereby movement of said head is resisted.

16. In a brake rigging, the combination of a brake beam provided with a shoulder, a brake head mounted on said beam and cooperating with said shoulder, means for locking said head on said beam, said locking means including frictionally cooperating members, one of said members being associated with said beam and the other of said members being associated with said head, and means for urging said members and said head and shoulder into frictional engagement for resisting movement of said head on said beam.

17. In a brake rigging, the combination of a brake beam provided with a shoulder, a brake head mounted on said beam and cooperating with said shoulder, means for locking said head on said beam, said locking means including frictionally cooperating members, one of said members being fixed to said beam and the other of said members being movable in accordance with the movement of said head, and means for urging said members and said head and shoulder into frictional engagement for resisting movement of said head on said beam.

18. In a brake rigging, the combination of a brake beam provided with a shoulder, a brake head mounted on said beam and cooperating with said shoulder, means for locking said head on said beam, said locking means including frictionally cooperating members, one of said members being fixed to said beam and the other of said members being movable in accordance with the movement of said head, and means between said second named member and said head for urging said members and said head and shoulder into frictional engagement for resisting movement of said head on said beam.

19. In a brake rigging, the combination of a brake beam, a brake head mounted on said beam, means for securing said head on said beam, said means including a member fixed in relation to said beam and a member movable in accordance with said head, and means for limiting rotation of said head on said beam.

20. In a brake rigging, the combination of a brake beam, a brake head mounted on said beam, and means for securing said head on said beam, said means including a member fixed in relation to said beam and a member movable in accordance with said head, said members having means for limiting rotation of said head on said beam.

21. In a brake rigging, the combination of a brake beam, a brake head mounted on said beam, means for securing said head on said beam, said means including a member fixed in relation to said beam and a member movable in accordance with said head, one of said members having an opening provided with spaced shoulders, and the other of said members having a lug disposed within said opening and engageable with said shoulders for limiting rotation of said head on said beam.

22. In a brake rigging, the combination of a brake beam provided with a shoulder, a brake head mounted on said beam and cooperating with said shoulder, means for locking said head on said beam, means between said locking means and head for urging said head into frictional engagement with said shoulder for resisting movement of said head on said beam, and means for limiting rotation of said head on said beam.

23. In a brake rigging, the combination of a brake beam provided with a shoulder, a brake head mounted on said beam and cooperating with said shoulder, means for locking said head on said beam, means between said locking means and head for urging said head into frictional engagement with said shoulder for resisting movement of said head on said beam, and means associated with said locking means for limiting rotation of said head on said beam.

24. In a brake rigging, the combination of a brake beam provided with a shoulder, a brake head mounted on said beam and cooperating with said shoulder, means for locking said head on said beam, said means including frictionally cooperating members, one of said members being fixed with said beam and being disposed in opposite relation to said shoulder and the other of said members being movable in accordance with said head, means for urging said members and said head and shoulder into frictional engagement for resisting movement of said head on said beam, and means for limiting rotation of said head on said beam.

25. In a brake rigging, the combination of a brake beam provided with a shoulder, a brake head mounted on said beam and cooperating with said shoulder, means for locking said head on said beam, said means including frictionally cooperating members, one of said members being fixed with said beam and being disposed in opposite relation to said shoulder and the other of said members being movable in accordance with said head, means for urging said members and said head and shoulder into frictional engagement for resisting movement of said head on said beam, said members having means for limiting rotation of said head on said beam.

26. In a brake rigging, the combination of a brake beam, a brake head mounted on said beam, and means for securing said head on said beam, said means including a member fixed in relation to said beam and a member movable in accordance with said head.

27. In a brake rigging, the combination of a brake beam, a brake head mounted on said beam, means for frictionally holding said head on said beam to prevent rotation thereof, said means including locking means for securing said head to said beam, said locking means comprising frictionally cooperating members, and resilient means between said head and one of said members and engaging therewith.

28. In a brake rigging, the combination of a brake beam, a brake head mounted on said beam, means for frictionally holding said head on said beam to prevent rotation thereof, said means including a member movable in accordance with said head and normally urged away from said head, and a member for securing said head on said beam and having frictional engagement with said first-named member.

29. The combination of a supporting member, a brake head mounted thereon and being adapted to have frictional engagement therewith, means for securing said head on said member, and means between said securing means and head for urging said head into said frictional engagement to resist movement thereof on said member, said securing means having means for limiting said movement of said head.

30. The combination of a supporting member, a brake head mounted thereon and being adapted to have frictional engagement therewith, resilient means for urging said head into said frictional engagement to resist movement thereof on said member, said means including a member fixed to said supporting member and a member movable in accordance with said head and having interlocking means for limiting movement of said head.

31. The combination of a supporting member, a brake head mounted thereon adjacent the end thereof and being adapted to have frictional engagement therewith, securing means for said head secured to the end of said member and having radially disposed abutment portions, and resilient means between said portions and said head for urging said head into said frictional engagement to resist movement thereof on said member.

32. The combination of a supporting member, a brake head mounted thereon adjacent the end thereof and being adapted to have frictional engagement therewith, securing means for said head secured to the end of said member and comprising frictionally cooperating members, one of said members being movable in accordance with said head, said member having radially disposed abutment portions, and resilient means between said portions and head for urging said head and said cooperating member into said frictional engagement for resisting movement of said head on said member.

33. In a brake rigging, the combination of a brake beam provided with a shoulder and a reduced journal end portion, a brake head having a hub mounted on said journal end portion and abutting said shoulder, means for securing said head to said beam, said means comprising a member fixed to the end of said beam, a plate member disposed between said fixed member and the hub of said head and adapted to move therewith, and spring means between said head and said plate for urging said head into frictional engagement with said shoulder and said plate into frictional engagement with said fixed member to resist movement of said head on said beam.

34. In a brake rigging, the combination of a brake beam provided with a shoulder and a reduced journal end portion, a brake head having a hub mounted on said journal end portion and abutting said shoulder, means for securing said head to said beam, said means comprising a member fixed to the end of said beam, a plate member disposed between said fixed member and the hub of said head and adapted to move therewith, said head and plate having oppositely disposed projecting elements, and a plurality of coil springs extending between said plate and head and fitting around said projecting elements for urging said head into frictional engagement with said shoulder and said plate into frictional engagement with said fixed member to resist movement of said head on said beam.

35. In a brake rigging, the combination of a brake beam provided with a shoulder and a reduced stepped journal end portion, a brake head having a hub formed with a stepped opening mounted on said journal end portion and abutting said shoulder, means for securing said head to said beam, said means comprising a member fixed to the end of said beam, a plate member disposed between said fixed member and the hub of said head and adapted to move therewith, and spring means between said head and said plate for urging said head into frictional engagement with said shoulder and said plate into frictional engagement with said fixed member to resist movement of said head on said beam.

36. In a brake rigging, the combination of a brake beam provided with a shoulder and a reduced stepped journal end portion, a brake head having a hub formed with a stepped opening mounted on said journal end portion and abutting said shoulder, means for securing said head to said beam, said means comprising a member fixed to the end of said beam, a plate member disposed between said fixed member and the hub of said head and adapted to move therewith, said head and plate having oppositely disposed projecting elements, and a plurality of coil springs extending between said plate and head and fitting around said projecting elements for urging said head into frictional engagement with said shoulder and said plate into frictional engagement with said fixed member to resist movement of said head on said beam.

37. In a brake rigging, the combination of a brake beam provided with a shoulder and a reduced journal end portion, a brake head having a hub mounted on said journal end portion and abutting said shoulder, means for securing said head to said beam, said means comprising a member fixed to the end of said beam, a plate member disposed between said fixed member and the hub of said head and adapted to move therewith, a plurality of coiled springs disposed in spaced relation between said plate and head whereby frictional resistance between said head and shoulder and between said plate and member resists movement of said head on said beam, said plate having opposite radially disposed cut-out portions, and lugs on said member extending into said cut-out portions and adapted to engage with the shoulders forming the same for limiting rotation of said head on said beam.

38. In a brake rigging, the combination of a brake beam provided with a shoulder and a reduced stepped journal end portion, a brake head having a hub formed with a stepped opening mounted on said journal end portion and abutting said shoulder, means secured to the end of said beam for attaching said head to said beam, and spaced resilient means disposed between said securing means and head for urging said head into frictional engagement with said shoulder to resist movement of said head on said beam.

39. In a brake rigging, the combination of a brake beam provided with a shoulder and a reduced stepped journal end portion, a brake head having a hub formed with a stepped opening mounted on said journal end portion and abutting said shoulder, means for securing said head to said beam, said means comprising a member fixed to the end of said beam, a member disposed between said fixed member and hub of said head and adapted to move therewith, and spaced resilient means between said head and said second-named member for urging said head into frictional engagement with said shoulder and said second-named member into frictional engagement with said fixed member to resist movement of said head on said beam.

40. In a brake rigging, the combination of a brake beam provided with a shoulder and a reduced stepped journal end portion, a brake head having a hub formed with a stepped opening mounted on said journal end portion and abutting said shoulder, means for securing said head to said beam, said means comprising a member fixed to the end of said beam, a member disposed between said fixed member and hub of said head and adapted to move therewith, and spaced resilient means between said head and said second-named member for urging said head into frictional engagement with said shoulder and said second-named member into frictional engagement with said fixed member to resist movement of said head on said beam, said members having means adapted to cooperate to limit movement of said head on said beam.

41. In a brake rigging, the combination of a brake beam, a brake head mounted thereon, securing means for said head, spaced resilient means between said securing means and head, and means associated with said securing means for limiting rotation of said head on said beam.

WALTER H. BASELT.